United States Patent
Klicpera

(10) Patent No.: US 6,390,892 B1
(45) Date of Patent: May 21, 2002

(54) METHOD AND DEVICE FOR NON-CIRCULAR CONTOUR MILLING WITH A CONICAL GRINDING WHEEL

(75) Inventor: Udo Klicpera, Allgäu (DE)

(73) Assignee: Reinecker Kopp Werkzeuemaschinen GmbH, Neu-Ulm (DE)

( * ) Notice: Subject to any disclaimer, the term of this patent is extended or adjusted under 35 U.S.C. 154(b) by 0 days.

(21) Appl. No.: 09/424,549

(22) PCT Filed: Mar. 25, 1999

(86) PCT No.: PCT/EP99/02112

§ 371 Date: Sep. 5, 2000

§ 102(e) Date: Sep. 5, 2000

(87) PCT Pub. No.: WO99/48644

PCT Pub. Date: Sep. 30, 1999

(30) Foreign Application Priority Data

Mar. 25, 1998 (DE) .......................................... 198 13 165

(51) Int. Cl.[7] .................................................. B24B 1/00

(52) U.S. Cl. ........................................... 451/47; 451/48

(58) Field of Search ............................... 451/28, 47, 48, 451/49, 52, 55

(56) References Cited

U.S. PATENT DOCUMENTS

| | | | | |
|---|---|---|---|---|
| 4,062,150 A | * | 12/1977 | Masuda et al. | 451/242 |
| 4,083,151 A | * | 4/1978 | Jessup et al. | 451/242 |
| 4,910,922 A | * | 3/1990 | Kotthaus | 451/253 |
| 5,255,475 A | * | 10/1993 | Kotthaus | 451/547 |

FOREIGN PATENT DOCUMENTS

| | | |
|---|---|---|
| DE | 19620813 A1 | 11/1997 |
| JP | 361-56820 | * 3/1986 |
| WO | WO 97/04415 | 2/1997 |

* cited by examiner

Primary Examiner—Derris H. Banks
(74) Attorney, Agent, or Firm—Innovation Law Group; Jacques M. Dulin

(57) ABSTRACT

Described is a method for the cutting machining of non-circular contours using a tool in the shape of a cone or a truncated cone positioned on a spindle for rotation, said spindle aligned at a certain angle with the workpiece axis on which the workpiece with the contour is positioned, whereby the tool is swiveled during the machining about at least one first swivel axis that is different from the spindle axis. Alternatively, the workpiece can be moved correspondingly, and the tool may remain unchanged in its alignment. Tool and workpiece also may undergo a corresponding movement together, since the crucial factor is solely the relative movement between tool and workpiece. Also described is a device for performing the method.

22 Claims, 4 Drawing Sheets

METHOD AND DEVICE FOR NON-CIRCULAR CONTOUR MILLING WITH A CONICAL GRINDING WHEEL

DESCRIPTION

1. Related Applications

This application is a US National Stage Application pursuant to 35 USC §371 based on the International Application PCT/EP99/02112, filed Mar. 25, 1999, which in turn claims the priority of the German Application DE 198 13 165.8, filed Mar. 25, 1998.

2. Field of the Invention

The invention relates to a method and a device for the cutting machining of non-circular internal and external contours, for example cam profiles.

BACKGROUND OF THE INVENTION

Known methods of this type use a conical grinding wheel that is carried by a spindle positioned at a certain angle in relation to the workpiece. This procedure has the advantage that, in particular for long workpieces such as camshafts, the grinding spindle can be constructed with a short, and thus rigid, design. If a grinding wheel in the shape of the cone or truncated cone is used, it must, however, be ensured that the surface line of the grinding surface on the wheel that engages with the workpiece is parallel to the desired surface; otherwise, the desired surface cannot be created, and a distortion of the surface occurs instead.

It is not a problem for dynamically balanced (circular) surfaces to be ground because the grinding wheel must only be aligned accordingly in relation to the workpiece. But for dynamically unbalanced (non-circular) surfaces, this is not possible with a stationary alignment of the grinding wheel in relation to the workpiece.

DE 196 20 813 A1 and WO 97/44159 therefore introduce a method for grinding cams in which the truncated cone-shaped grinding wheel is moved up and down on a Y axis in relation to the workpiece in order to ensure a corresponding alignment in relation to the workpiece. In this respect, reference is made to FIG. 4 of these documents.

When machining the displayed cam, a stationary alignment of the grinding wheel according to the unbroken line would cause the grinding zone on the grinding wheel to be shifted between points A and B due to the non-circular cam contour. Since the surface line of the grinding surface at the points above and below the axis, that is, also on points A and B, is not parallel to the desired surface, an unwanted distortion of the ground surface would occur in this area.

To prevent this distortion, the mentioned documents provide that the grinding wheel is moved along the Y axis, for example into the position indicated by the broken lines. Although this does prevent a distortion, it was found that for certain contours no satisfactory grinding result can be obtained in this manner.

SUMMARY OF THE INVENTION

The invention is based on the task of creating a method, as well as a device for the cutting machining of non-circular internal and external contours, which ensures a high machining quality.

This objective is realized by the characteristics of Claims 1 and 2, or 13 and 14 respectively.

The invention is based on the idea of realizing this objective with a continuous relative movement between tool and workpiece and achieving a satisfactory machining result. In the process, the inventors found that an optimum result can be obtained with a swivel movement, since this swiveling of the tool or workpiece results in a wobbling (or sweeping) movement, which again results in a high quality machining result, since no machining marks are created. Furthermore, in certain machining tasks, substantially better machine dynamics and a more favorable acceleration of the tool in relation to the workpiece can be achieved in this manner.

The invention creates a method for the cutting machining of non-circular contours, such as cams, which uses a tool in the shape of a cone or a truncated cone, for example a grinding wheel, positioned on a spindle for rotation, with said spindle aligned at a certain angle with the workpiece axis on which the workpiece with the contour is positioned, whereby the tool is swiveled during the machining about at least one first swivel axis that is different from the spindle axis.

Since, naturally, the crucial factor here is solely the relative movement between tool and workpiece, the workpiece can be moved accordingly as an alternative. For this purpose, the tool is swiveled during the machining about at least one first swivel axis that is different from the workpiece axis.

Preferably, the first swivel axis is arranged parallel to the spindle axis or workpiece axis at a certain distance. In addition, good machining results can be obtained if the tool or workpiece is swiveled during machining also about a second swivel axis. Here also, the crucial factor is solely the relative movement between tool and workpiece, so that it is also possible to swivel the tool about one axis, and the workpiece about another axis (sequentially or simultaneously).

In principle, very different orientations of the swivel axes are conceivable to achieve the desired effect and to keep the engagement line of the tool parallel to the desired surface. An orientation of the first swivel axis vertical to the spindle axis or the workpiece axis was found to be successful, whereby the second swivel axis stands vertical to the spindle axis or workpiece axis and also still vertical to the first swivel axis.

The first swivel axis is preferably located in the area of the tool or the contour to be machined. Furthermore, it was found that a successful arrangement of the second swivel axis is located on the spindle axis behind the first swivel axis when seen from the workpiece (10' in FIG. 2).

To increase the machining possibilities, the tool may be positioned so that it can slide along the spindle axis, for example in a linear bearing. To adjust the machine to the actual machining task or to the particular tool used, for example to the cone angle of a conical grinding wheel, the angle of the spindle axis may be adjustable in relation to the workpiece axis.

It was also found to be advantageous if the workpiece can be machined with at least two tools while it is mounted. This means that while grinding a camshaft, a pre-grinding with a grinding disk that has a relatively large diameter is possible, for example, which is then followed by a final grinding with a grinding wheel that has a smaller diameter. For this purpose, the spindle head for positioning the spindle can be swiveled to permit the engagement of another tool positioned on the spindle head with the workpiece.

For camshafts, for example, angled or crowned contours of the cams may be desirable. To achieve them, the tool may be provided with such a surface line. If necessary, the tool, as one example, a grinding wheel, can be adjusted accordingly. The invention is explained below in more detail in reference to two exemplary embodiments.

DETAILED DESCRIPTION INCLUDING THE BEST MODES OF CARRYING OUT THE INVENTION

Figure 3:
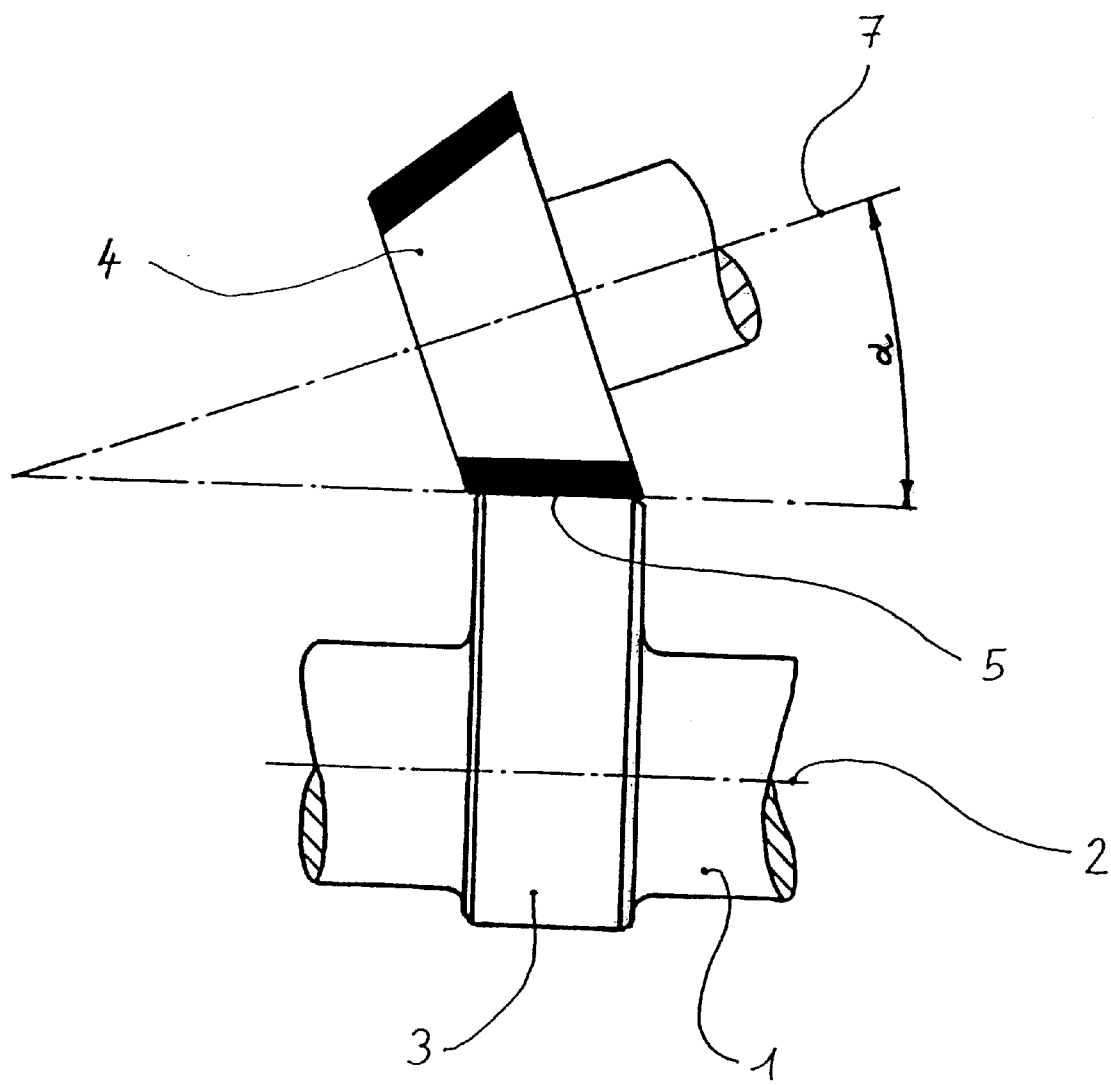
FIG. 3 shows a grinding wheel in the shape of a truncated cone that is engaged with a cam of a camshaft.
Figure 4:
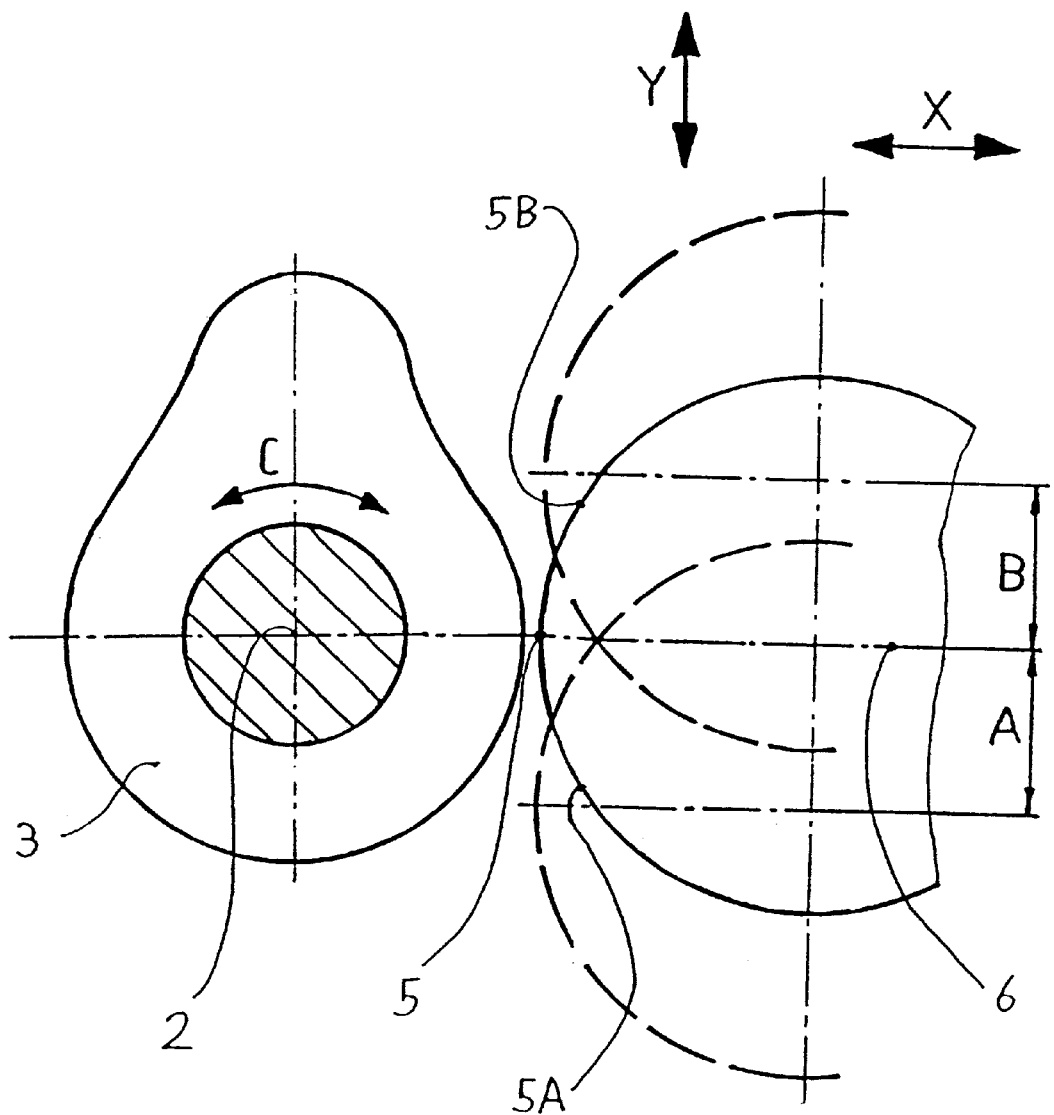
FIG. 4 shows a section through the cam and the grinding wheel with the truncated cone shape.

Next, reference is made to FIGS. 3 and 4 which show the basic machining situation, here in the form of a camshaft whose cams are ground with a truncated, cone-shaped grinding wheel. The camshaft 1 is positioned on a workpiece axis 2 and has a cam 3 that should be ground using the shown grinding wheel 4. In order to obtain the desired cam contour—in this case the cam surface should be parallel to the workpiece axis 2 in the section—the engagement line 5 of the mantle surface of the grinding wheel 4 must be aligned parallel with the workpiece axis 2. This alignment is ensured by angling the spindle axis 7 of the grinding wheel 4 by an angle $\alpha$. FIG. 3 shows an alignment of the grinding wheel 4 that ensures a distortion-free grinding of the upper cam part, but in which it is not possible to grind the lower part without distortion in this alignment, which is explained below. The cam 3 has a non-circular design, as seen in FIG. 4. During the grinding process, the engagement line 5 on the axis 6 is maintained in the lower concentric part of the cam 3. But when the upper, non-circular or non-concentric section of the cam 3 is ground, the engagement line, given an unchanged alignment of the grinding wheel 4, first shifts by an amount B upwards into position 5B, and then downwards by an amount A below the axis 6 into position 5A. But, in positions 5A and 5B, the engagement line 5 of the truncated cone-shaped grinding wheel 4 is not parallel to the desired cam surface, and this results in a deviation of the angle or a distortion of the cam surface. This distortion increases as the cone angle of the grinding wheel 4 increases.

To solve this problem, it is suggested by DE 196 20 813 A1 and WO 97/44159 to move the grinding wheel 4 along the Y axis between the return points in positions 5A and 5B in such a way that the engagement line 5 is always on the axis 6 (as the cam rotates as shown by Arrow C).

According to the invention, the grinding wheel 4 or the spindle axis 7 is swiveled during the grinding in relation to the angle position of the camshaft 1 about a first swivel axis 8. By swiveling the spindle axis 7 accordingly, the engagement line 5 of the grinding wheel 4, for example, can always be kept parallel to the workpiece axis 2. Naturally, a corresponding swiveling also can be used to intentionally achieve a non-parallel alignment, in order to, for example, achieve an angled grinding of the cam surface, if necessary, over a certain area.

According to the second exemplary example, this is achieved by a swiveling of the spindle axis 7 about two axes, whereby the first swivel axis 9 is vertical to the spindle axis 7, and the second swivel axis 10 is vertical to the spindle axis 7 as well as to the first swivel axis 9. As shown, the second swivel axis 10 is located at a certain distance from the other axes.

Figure 1:
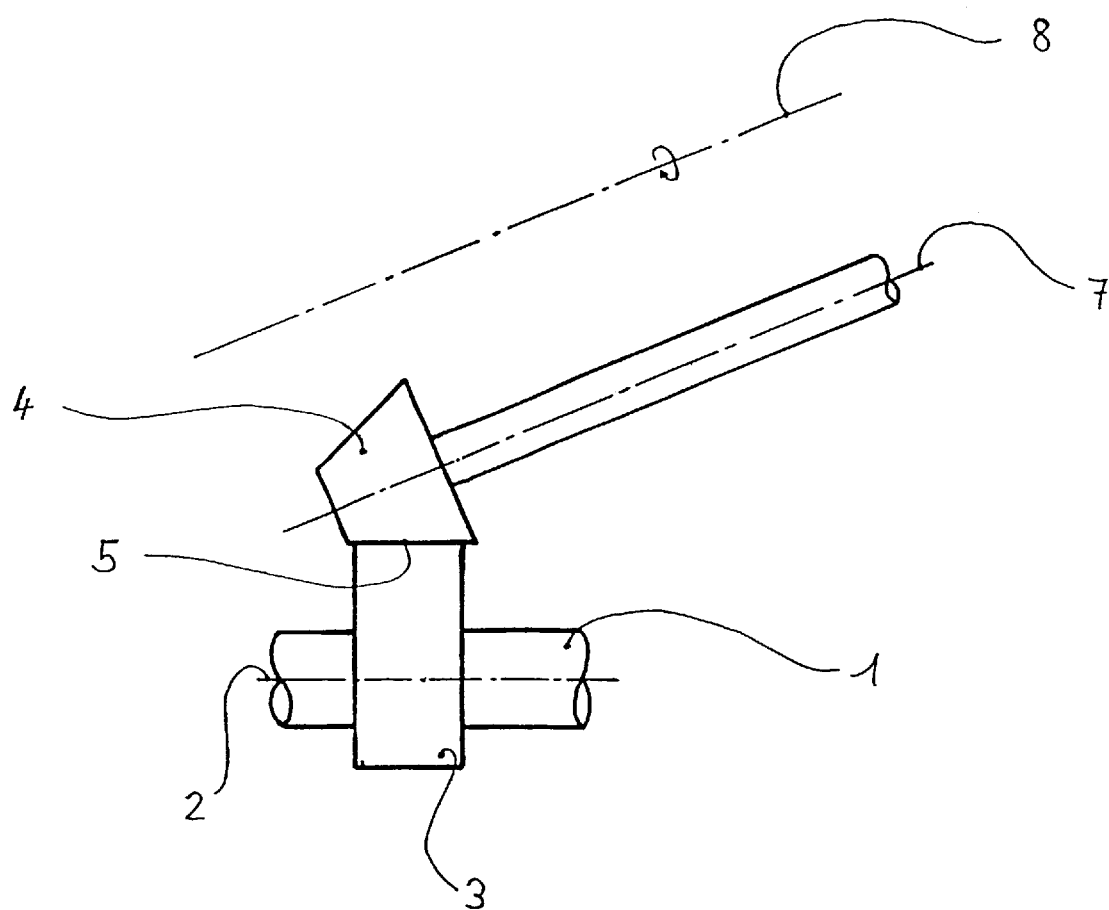
FIG. 1 shows a first exemplary embodiment of the invention.
Figure 2:
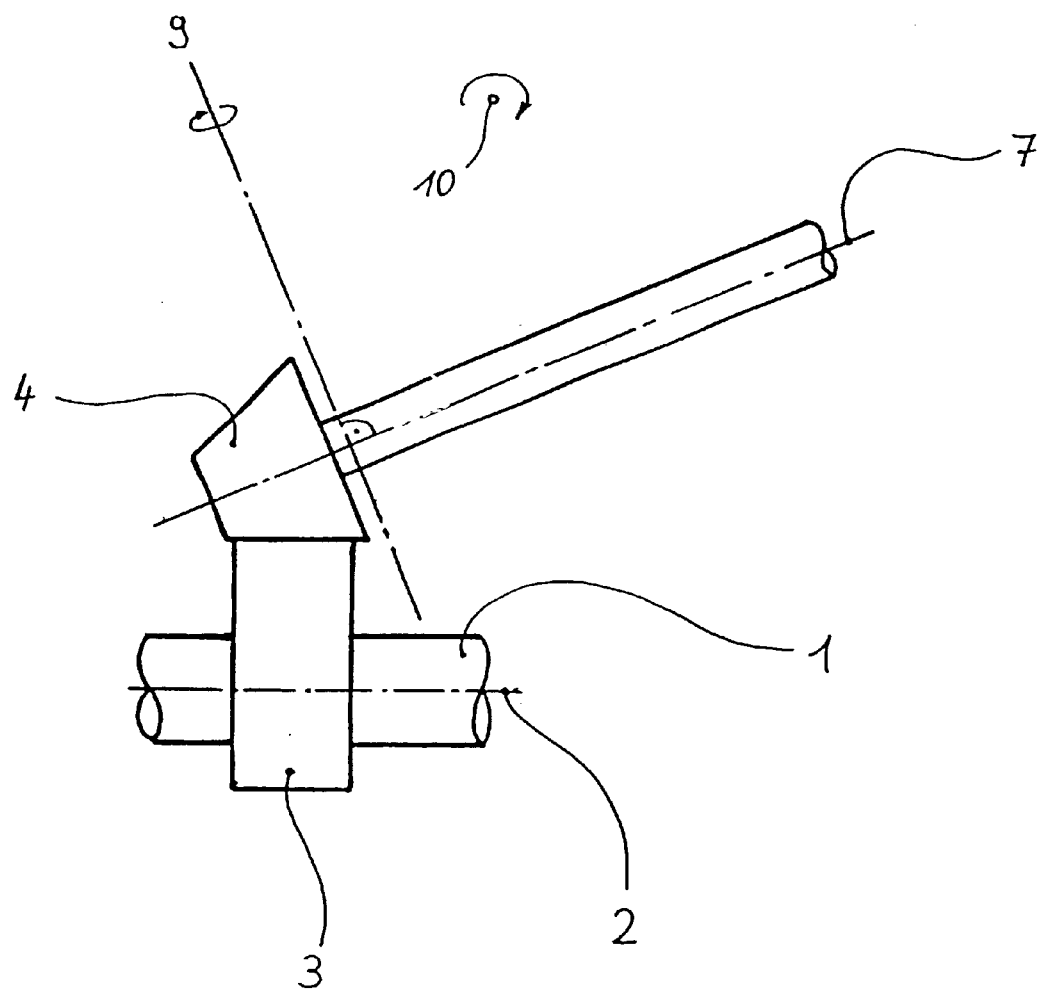
FIG. 2 shows a second exemplary embodiment of the invention.

In general, it is advantageous if in a design according to FIG. 2 the first swivel axis 9 is located in (or intersects) the area of either the surface to be machined or the tool (i.e., it is close to the grinding wheel 4). The optimum design of the swivel axis depends on the particular machining task and the machining tool. The selection of the axes results in a specific relative movement between workpiece and tool, depending on the specific machining task, which again results in certain machine dynamics. Since, in principle, the most continuous machining process possible is desired without any major acceleration of the tool in relation to the workpiece, the optimal choice of the swivel axis or swivel axes depends on the machining task. But an optimization to this effect, using movement equations, is part of the tools of the expert responsible for this (i.e., one of ordinary skill in the art) and need not be explained in more detail.

In the described exemplary example, the grinding wheel is moved in relation to the workpiece. Since the crucial factor is solely the relative movement between tool and workpiece, the workpiece can be moved in relation to the tool, as well, or both elements can be moved so that a corresponding relative movement is obtained.

PARTS LIST

This Parts List of the figure labels is for the convenience of examination, and may be canceled at the time of issuance.

$\alpha$ spindle axis angle relative to workpiece axis
B engagement line upward shift
A engagement line downwards shift
C workpiece rotation direction
1 workpiece shaft (e.g., camshaft)
2 workpiece axis (e.g., camshaft axis)
3 workpiece (e.g., cam)
4 tool (e.g., grinding wheel)
5 engagement line
5B engagement line upward position
5A engagement line downwards position
6 X axis (perpendicularly intersects the workpiece axis)
7 spindle axis (tool axis)
8 "first" first swivel axis (parallel to spindle or workpiece axis)
9 "alternative" first swivel axis (perpendicular to spindle or workpiece axis)
10 second swivel axis (perpendicular to first swivel axis, and perpendicular to spindle axis or workpiece axis)

What is claimed is:

1. In a method for the machining of non-circular contours on a workpiece positioned on a workpiece axis, said method uses at least one tool in the shape of one of a cone or a truncated cone; said tool is positioned on a spindle for rotation, said spindel having an axis, with said spindle axis aligned at a selected angle with said workpiece axis, the improvement comprising the step of:

swiveling the tool relative to the workpiece during the machining about at least a first swivel axis that is different from both the spindle axis and the workpiece axis.

2. The improved method as claimed in claim 1, wherein:
    the first swivel axis is arranged spaced a selected distance from and parallel to the spindle axis.

3. The improved method as claimed in claim 1, further comprising:
    the step of swiveling the tool relative to the workpiece about a second swivel axis during machining.

4. The improved method as claimed in claim 3, wherein:
    a) the first swivel axis is perpendicular to the spindle axis; and b) the second swivel axis is perpendicular to both the first swivel axis and the spindle axis.

5. The improved method as claimed in claim 3, wherein:
the first swivel axis intersects the region defined by one of the tool and the contour being machined.

6. The improved method as claimed in claim 3, wherein:
the second swivel axis intersects the spindle axis behind the first swivel axis as seen from the workpiece.

7. The improved method as claimed in claim 1, further comprising the step of:
sliding the tool along the spindle axis.

8. The improved method as claimed in claim 1, further comprising the step of:
adjusting the angle of the spindle axis in relation to the workpiece axis.

9. The improved method as claimed in claim 1, wherein:
a) said at least one tool and said spindle are supported and positioned by a spindle head, said spindle head includes at least a first tool and a second tool positioned thereon, and the spindle head can be swiveled to permit the engagement with the workpiece of said second tool positioned on the spindle head; and
b) said method includes the step of swiveling said spindle head and engaging said second tool with said workpiece.

10. The improved method as claimed in claim 1, further comprising the step of:
adjusting said spindle angle so that said spindle angle is different than the angle of said cone of said tool shape in order to achieve an angled or crowned contour of said workpiece.

11. The improved method as claimed in claim 1, wherein:
a) said workpiece is a camshaft; and
b) at least one of said tools is a grinding wheel.

12. In a device for machining of non-circular contours on a workpiece positioned on a workpiece axis, said device includes at least one tool in the shape of one of a cone and a truncated cone; said tool is mounted on a spindle for rotation, said spindle having an axis, and said spindle axis is aligned at a selected angle with respect to said workpiece axis, said device includes a workpiece positioning mechanism and a spindle head for positioning said tool, the improvement comprising:
said spindle head includes a first swiveling mechanism for swiveling said tool so that during the machining the tool can be swiveled relative to the workpiece about a first swivel axis that is different from both the spindle axis and the workpiece axis.

13. The improved device as claimed in claim 12, wherein:
the first swivel axis is arranged spaced a selected distance from and parallel to the spindle axis.

14. The improved device as claimed in claim 12, wherein:
said spindle head includes a second swiveling mechanism for swiveling said tool so that the tool can be swiveled relative to the workpiece about a second swivel axis during machining.

15. The improved device as claimed in claim 14, wherein:
a) the first swivel axis is perpendicular to the spindle axis; and
b) the second swivel axis is perpendicular to both the first swivel axis and the spindle axis.

16. The improved device as claimed in claim 14, wherein:
the first swivel axis intersects the region defined by one of the tool and the contour to be machined.

17. The improved device as claimed in claim 12, wherein:
the second swivel axis intersects the spindle axis behind the first swivel axis as seen from the workpiece.

18. The improved device as claimed in claim 12, wherein:
said device includes a linear bearing mounting the tool so that said tool is able to slide along the spindle axis.

19. The improved device as claimed in claim 12, wherein:
said device includes an adjustment mechanism permitting the adjustment of the angle of the spindle axis relative to the workpiece axis.

20. The improved device as claimed in claim 12, wherein:
a) said device includes a spindle head supporting and positioning said at least one tool, and said spindle head includes at least a first tool and a second tool positioned thereon, and
b) said device includes a spindle head swiveling mechanism permitting the swiveling of the spindle head to permit the engagement of a selected one of said first tool and said second tool with the workpiece.

21. The improved device as claimed in claim 20, wherein:
said first tool has a larger diameter than said second tool for pre-machining and said second tool has a smaller diameter than said first tool for finishing.

22. The improved device as claimed in claim 12, wherein:
a) said workpiece is a camshaft; and
b) said at least one tool is removably mounted on said spindle so that said at least one tool can be retrofitted by substitution of a grinding wheel.

\* \* \* \* \*

UNITED STATES PATENT AND TRADEMARK OFFICE
CERTIFICATE OF CORRECTION

PATENT NO.    : 6,390,892 B1
DATED         : May 21, 2002
INVENTOR(S)   : Udo Klicpera It is certified that error appears in the above-identified patent and that said Letters Patent is hereby corrected as shown below:

<u>Title page,</u>
Item [73], Assignee, should read -- Reinecker Kopp Werkzeugmaschinen GmbH, Neu-Ulm (DE) --

Signed and Sealed this

Twenty-third Day of July, 2002

Attest:

Attesting Officer

JAMES E. ROGAN
*Director of the United States Patent and Trademark Office*